May 19, 1970 T. WÜST 3,513,279
DEVICE FOR ACTUATING UPSETTING STEELS
Filed Aug. 23, 1967
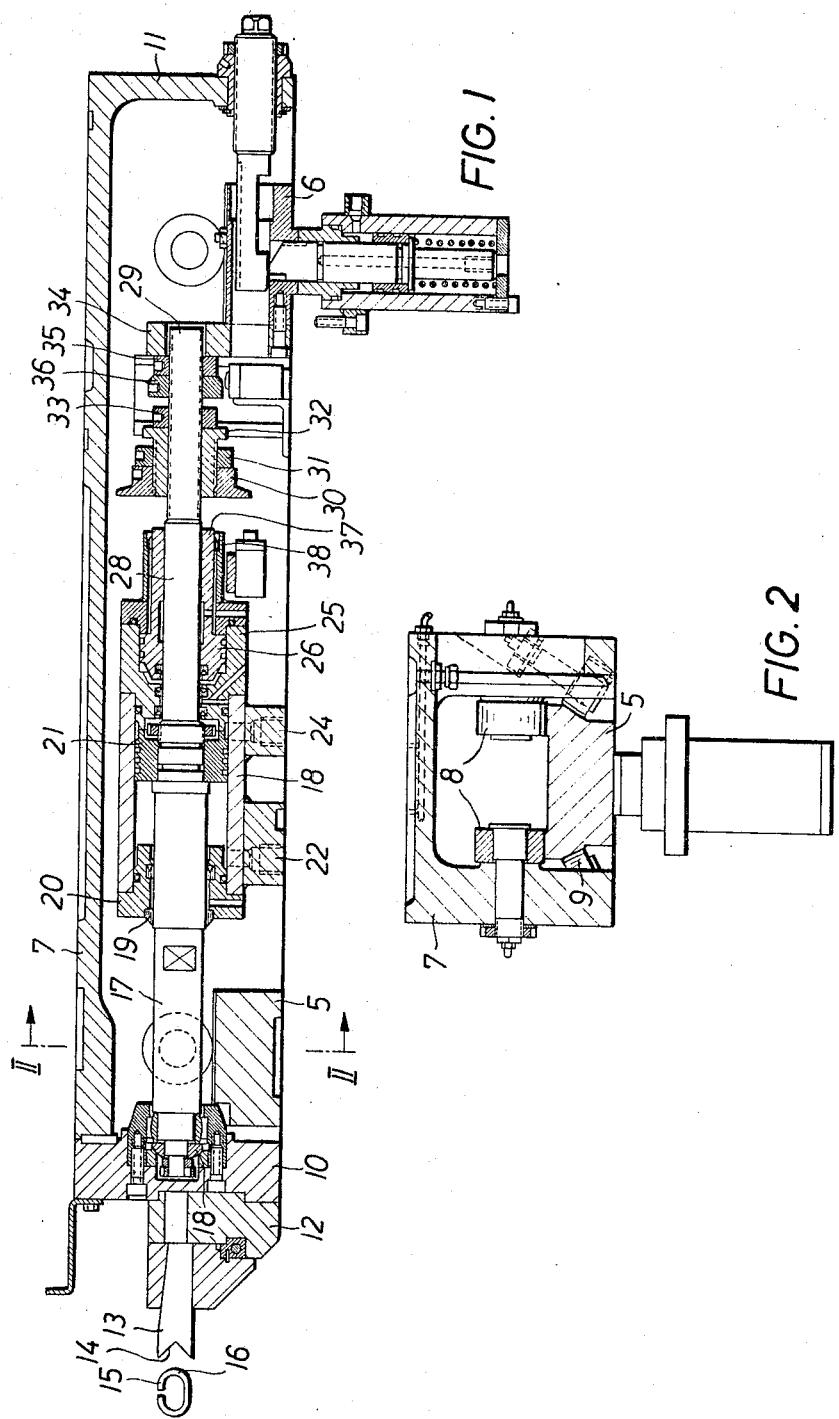
INVENTOR
Toni Wüst
BY
Richards & Geier
ATTORNEYS

United States Patent Office 3,513,279
Patented May 19, 1970

---

3,513,279
DEVICE FOR ACTUATING UPSETTING STEELS
Toni Wüst, 15 Hauschensweg, 5 Cologne-
Bickendorf, Germany
Filed Aug. 23, 1967, Ser. No. 662,793
Claims priority, application Germany, Dec. 13, 1966,
M 71,999
Int. Cl. B21l 3/02
U.S. Cl. 219—51                                    2 Claims

---

ABSTRACT OF THE DISCLOSURE

The upsetting steel of a singeing and welding machine is moved to an operative position by a device which includes a cylinder actuated by a pressure medium and a damping cylinder, and a damping piston which become operative during the last portion of the feed movement.

---

This invention relates to a device for moving upsetting steels of electrical singeing and welding machines, particularly for C-shaped chain links.

Prior art machines have devices which move the upsetting steels into the required position by causing them to strike a fixed end stop. When upsetting speeds are high it is necessary to use a comparatively high upsetting force so that when the resistance is comparatively weak, for example, when a small or yieldable chain link is being treated, the upsetting screw strikes hard against the end stop. This creates concussions in the weld and a drop of the upsetting force at the slit being welded. All this produces defective welds.

An object of the present invention is to provide means avoiding these drawbacks.

Another object is the provision of means which will assure a good weld and precise final measurements of the welded links or other workpieces.

Other objects of the present invention will become apparent in the course of the following specification.

In the accomplishment of the objectives of the present invention it was found desirable to include a damping member, particularly a damping cylinder for the last stroke portion of the feed movement of the upsetting steel. From a constructional point of view it is of advantage to provide the damping cylinder with a damping piston having the same longitudinal axis as the cylinder and located behind the cylinder in the direction of the feed movement. Preferably the damping effect is so adjusted that the same pressure medium with the same pressure is used in a simple manner for the feed cylinder as well as for the damping cylinder; however, the surface of the damping cylinder is made smaller than that of the feed cylinder corresponding to the desired damping.

The invention will appear more clearly from the following detailed description when taken in connection with the acompanying drawing, showing by way of example, a preferred embodiment of the inventive idea.

In the drawing:

FIG. 1 is a longitudinal section through an apparatus constructed in accordance with the principles of the present invention.

FIG. 2 is a transverse section along the line II—II of FIG. 1.

The drawing shows two guides 5 and 6 fixed upon the base of an electrical singeing and welding machine for C-shaped chain links which is not illustrated in detail. As shown best in FIG. 2, a casing 7 having rollers 8 and 9 is movable longitudinally upon these guides. The stroke of this casing is small, so that the guides can be made short. The casing has a front wall 10 and a rear wall 11.

A holder 12 for an upsetting steel 13 is mounted at the front wall. The steel 13 has operative surfaces 14 which engage the head 16 of a diagrammatically shown chain link 15. A piston rod 17 supported by a ball bearing is held at the interior of the casing 7 adjacent the front wall 10, so that a certain angular adjustment is possible. The piston rod extends through a cylinder 18 which is fixed upon the base of the machine, namely, it passes through the cylinder cover 20 provided with a packing bush 19. Within the cylinder is a piston 21 which is connected with the piston rod. The piston rod is also connected with other parts which are not shown since they do not constitute a part of the present invention. A passage 22 supplies pressure medium for the withdrawal of the piston, while the passage 24 supplies pressure medium for the forward movement of the piston, the piston rod and thus of the casing along with the holder and its upsetting steel.

In accordance with the present invention the rear cover 25 of the upsetting cylinder 18 also has the shape of a cylinder and contains a piston 26. Its piston rod 27 extends rearwardly and has a portion 28 of smaller diameter which is followed by a threaded portion 29 of still smaller diameter. The portion 29 carries a threaded sleeve 32 upon which are adjustably mounted a set screw 30 and a counter screw 31. The sleeve 32 can be adjusted by a counter screw 33 carried upon the threaded portion 29. Screw 35 and counter screw 36 carried by the piston rod can engage the bracket 34 to stop the movement.

The operation of the device is as follows:

The upsetting steel 13 is moved forward toward the chain link 15 to engage the link. This movement is effected by pressure medium supplied through the passage 24 into the interior of the cylinder 18. The pressure medium will engage and move the piston 21 along with its piston rod 17, the casing 7 and the steel 13 connected therewith. The piston rod 17 is also connected through the piston 21 with a piston rod extension having a threaded rear portion 29 carrying a sleeve 32, so that these parts will also participate in the movement. However, the position of the sleeve 32 has been adjusted before the machine starts its operation in such manner that, during this forward movement and shortly before the steel 13 has reached its final position engaging the chain link, the sleeve 32 will strike the stop 37 constituting a part of the piston 26. Then during the remainder of the forward movement the piston 26 will be moved also until the set screw 30 which is screwed upon the sleeve 32, will strike the extension 38 of the cylinder 25. Then the forward movement is at an end.

It is apparent that the example described above has been given solely by way of illustration and not by way of limitation and that it is capable of many variations and modifications within the scope of the present invention. All such variations and modifications are to be included within the scope of the present invention.

What is claimed is:

1. In an electrical singeing and welding machine for C-shaped chain links having an upsetting steel and a holder carrying said steel, a device for actuating said holder, said device comprising a movable casing carrying said holder, a piston rod located in said casing and connected therewith, a fixed upsetting casing enclosing a portion of said piston rod, a piston connected with said piston rod and located within said fixed casing, said fixed casing having passages formed therein for supplying a pressure medium to opposite sides of said piston to provide a forward and rearward movement thereof, said fixed casing further having a rear cylinder-like portion, another piston located in said cylinder-like portion and having a stop, said piston rod extending through said other piston and having a threaded end portion, a sleeve carried by said threaded end portion and adapted to strike said stop during said forward movement, and a set screw carried by said sleeve and adapted to strike said fixed casing to end said forward movement.

2. A machine in accordance with claim 1, wherein said fixed casing has a smaller diameter than said movable casing.

References Cited

UNITED STATES PATENTS

| 2,288,494 | 6/1942 | Speed et al. | 219—51 |
| 2,464,875 | 3/1949 | Lewis et al. | 219—51 |
| 2,650,572 | 9/1953 | Amstutz | 92—85 X |

JOSEPH V. TRUHE, Primary Examiner

W. D. BROOKS, Assistant Examiner